UNITED STATES PATENT OFFICE.

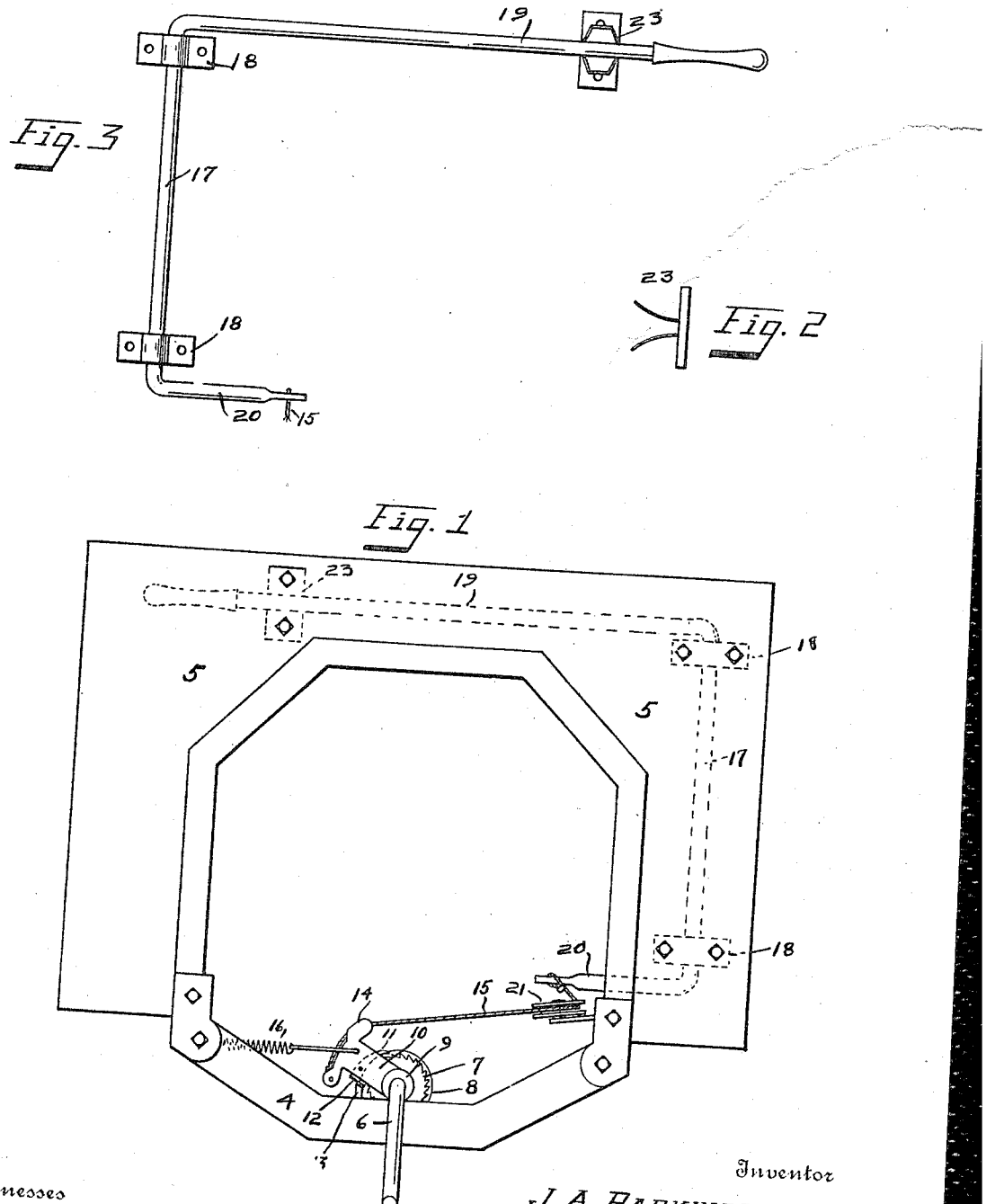

JOHN A. PARKINSON, OF SIOUX CITY, IOWA.

ACTUATING MEANS FOR MOTOR-STARTERS.

1,155,003. Specification of Letters Patent. Patented Sept. 28, 1915.

Division in part of application Serial No. 791,663, filed September 24, 1913. This application filed July 2, 1914. Serial No. 848,674.

*To all whom it may concern:*

Be it known that I, JOHN A. PARKINSON, a citizen of the United States, and a resident of Sioux City, in the county of Woodbury and State of Iowa, have invented certain new and useful Improvements in Actuating Means for Motor-Starters, of which the following is a specification.

The present invention relates to means for starting automobile gas-engines.

The invention has for its primary object the production of improved actuating means for mechanical motor starters employing ratchet and pawl mechanism for turning the main-shaft.

The invention contemplates horizontally-operated hand-lever mechanism for operating the ratchet members, which, as far as I am aware, have not been known or used heretofore.

A further object of the invention is the production of a hand-lever particularly efficacious and inexpensive both in manufacture and installation.

With these objects in view the invention will be readily understood from the following description, reference being had to the accompanying drawings which form a part of this application and in which like characters of reference indicate corresponding parts throughout the several views, of which,—

Figure 1 is a fragmentary front elevation of an automobile chassis equipped with the device of my invention; Fig. 2 is a side elevation of the buffer; and Fig. 3 is a rear elevation of the hand-lever and members associated therewith.

Referring, now, to the illustrations, the main-frame of the chassis is represented at 4, and equipped with the usual dash, 5, and starting-crank, 6.

7 is a ratchet-wheel formed integrally with the fan-belt-pulley, 8. A collar, 9, freely encircles the shank of the hand-crank and carries a radial arm, 10, provided on its rear side with a pawl, 11, pivoted to engage the ratchet-wheel and having its heel, 12, normally engaged by a stop, 13, on the frame, whereby the pawl is normally disengaged from the ratchet-wheel. The lever-arm, 10, terminates in a segment, 14, to the lower end of which is attached a flexible link, 15. A spring, 16, the ends of which are secured, respectively, to the main-frame and the lever-arm, serves to retract the latter.

The fragmentary structure above described represents no part of the present invention, but forms, in part, the subject-matter of my copending applications 791,663, filed September 24, 1913; and 848,673, filed July 2, 1914, and serves to illustrate the utility of the present invention.

On the rear side of the dash and adjacent one edge thereof is an upright shaft, 17, freely inclosed by bearings, 18, mounted upon the dash. The upper end of said shaft is provided with a horizontally-disposed hand-lever, 19, and the lower end carries a lateral arm, 20, to the end of which is secured the link, 15, passing around a direction pulley, 21, and secured to the arm 10 as previously described.

By virtue of the structure now disclosed it is clear that in starting the motor, the driver draws the hand-lever toward him, thereby imparting traction upon the link 15 to actuate the pawl and ratchet mechanism. When released the hand-lever is retracted by the spring 16; and the shock incident to the retraction is reduced by a V-shaped socket, 23, the arms of which tend to spring toward each other and engage opposite sides of the lever. The lever is so designed as to afford a great purchase, is within convenient reach of the driver yet never in his way, and is readily installed.

Having thus described my invention, what I claim as new and desire to secure by Letters Patent, is,—

In an automobile motor-starter having a ratchet-wheel mounted on the main-shaft and a retractable radial arm provided with a pawl to engage the ratchet-wheel, the combination of an upright shaft mounted upon the dash and having a lateral arm on its lower end and a horizontal lever formed on its upper end and normally disposed substantially in parallelism with the dash, a link between said arms, and shock-absorbing means interposed between the dash and lever.

In testimony whereof I have hereunto set my hand in presence of two subscribing witnesses.

JOHN A. PARKINSON.

Witnesses:
M. S. CRANDALL,
R. W. McDONALD.